(12) United States Patent
Lutgenau

(10) Patent No.: US 10,010,964 B2
(45) Date of Patent: Jul. 3, 2018

(54) MOUNT FOR A WELDING GUN FOR CONNECTING SAID WELDING GUN TO AN ARM OF A WELDING ROBOT

(71) Applicant: Dinse G.m.b.H., Hamburg (DE)

(72) Inventor: Albert Lutgenau, Henstedt-Ulzburg (DE)

(73) Assignee: Dinse G.m.b.H., Hamburg (DE)

( * ) Notice: Subject to any disclaimer, the term of this patent is extended or adjusted under 35 U.S.C. 154(b) by 972 days.

(21) Appl. No.: 14/477,936

(22) Filed: Sep. 5, 2014

(65) Prior Publication Data
US 2015/0069039 A1 Mar. 12, 2015

(30) Foreign Application Priority Data
Sep. 11, 2013 (EP) ..................................... 13183999

(51) Int. Cl.
*B23K 9/28* (2006.01)
*F16B 13/08* (2006.01)
*B23K 37/02* (2006.01)
*B23K 9/173* (2006.01)
*B23K 9/29* (2006.01)
*F16C 11/10* (2006.01)

(52) U.S. Cl.
CPC .............. *B23K 9/287* (2013.01); *B23K 9/173* (2013.01); *B23K 9/295* (2013.01); *B23K 37/0241* (2013.01); *F16C 11/103* (2013.01); *Y10S 901/28* (2013.01); *Y10S 901/42* (2013.01)

(58) Field of Classification Search
CPC . Y10S 901/28; Y10S 901/42; B23K 37/0241; B23K 9/173; B23K 9/287; B23K 9/295; F16C 11/103; Y10T 403/7047; Y10T 403/7049; Y10T 403/7051; Y10T 403/7052; Y10T 403/7054; Y10T 403/7056; Y10T 403/7058; F16B 13/124; F16B 13/0841; F16B 13/0891
USPC .................................................. 411/24, 55, 75
See application file for complete search history.

(56) References Cited

U.S. PATENT DOCUMENTS

| 4,192,621 A | * | 3/1980 | Barth | .................... F16B 31/043 |
| | | | | 29/523 |
| 4,913,577 A | * | 4/1990 | Forslund | .............. B23Q 1/4828 |
| | | | | 403/158 |

(Continued)

FOREIGN PATENT DOCUMENTS

| JP | 2005-324250 | 11/2005 |
| JP | 2009-142922 | 7/2009 |

*Primary Examiner* — Geoffrey S Evans
(74) *Attorney, Agent, or Firm* — Sand & Sebolt

(57) ABSTRACT

A mount for connecting a welding gun to a welding robot's arm. An articulated joint is provided between two rigid elements of the mount. The joint includes a sleeve securable to a first element. A first bore is provided on the second element. The sleeve is inserted into the bore. The bore's inner diameter and the sleeve's outer diameter allow the second element to turn with the first bore relative to the sleeve. An expansion element provided in the interior of the sleeve is displaceable in the longitudinal direction of the sleeve. The expansion element has a central opening through which a tensioning bolt is passed. The bolt threadably engages a support element causing expansion of the sleeve, thereby causing the sleeve to seize around the circumference thereof in the bore. The expansion and seizing of the sleeve is neutralized by a release and stop.

16 Claims, 6 Drawing Sheets

(56) References Cited

U.S. PATENT DOCUMENTS

| | | | |
|---|---|---|---|
| 2010/0226715 A1* | 9/2010 | Schneider | F16B 3/06 403/350 |
| 2012/0121319 A1* | 5/2012 | Svensson | F16C 11/045 403/20 |
| 2013/0034380 A1* | 2/2013 | Cutsforth | F16M 11/10 403/110 |

* cited by examiner

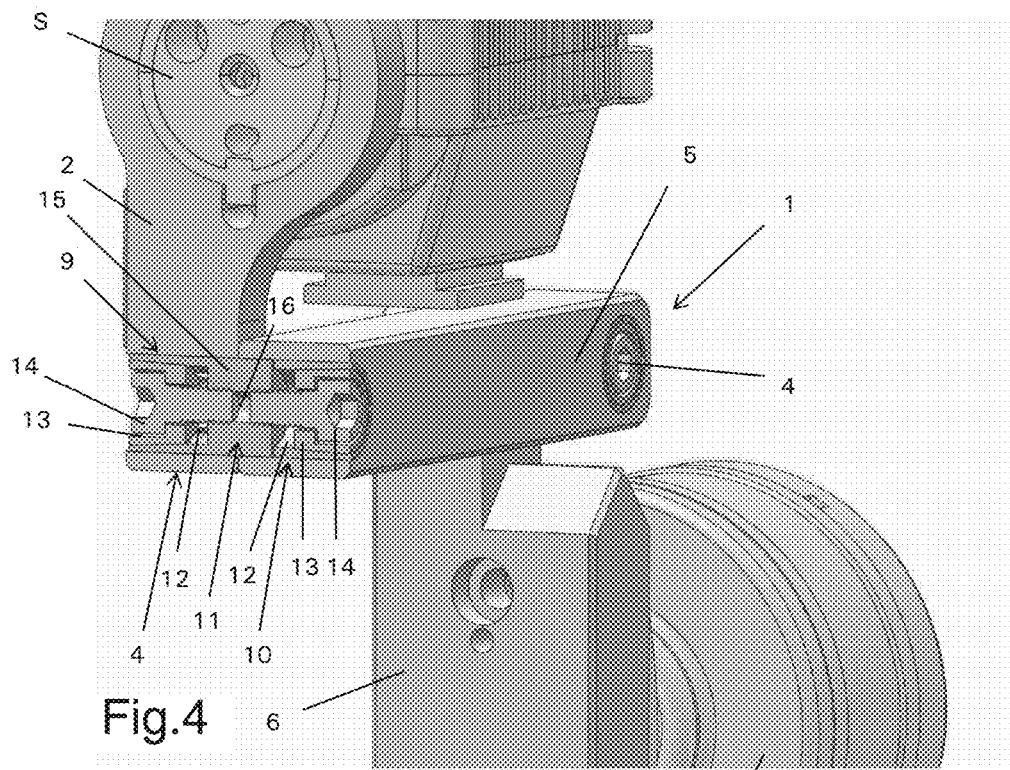
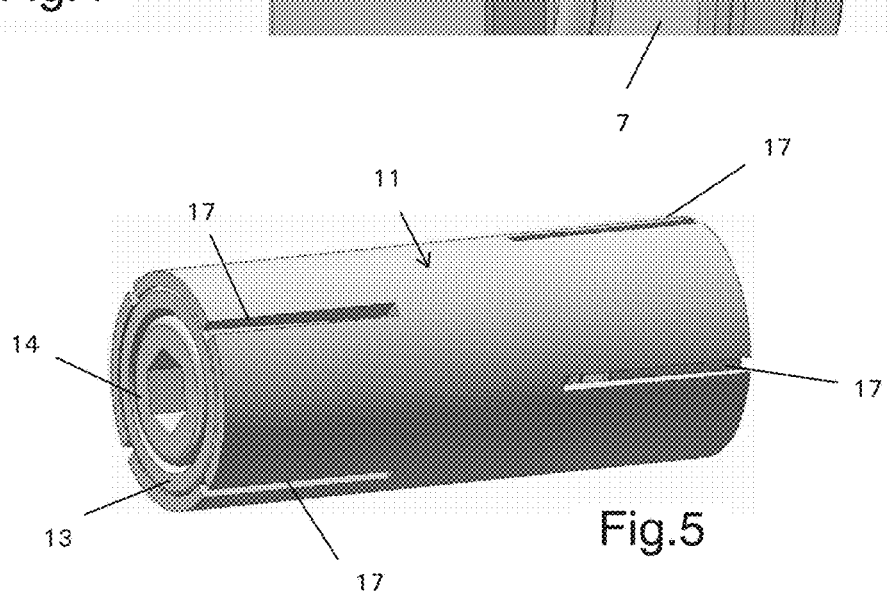

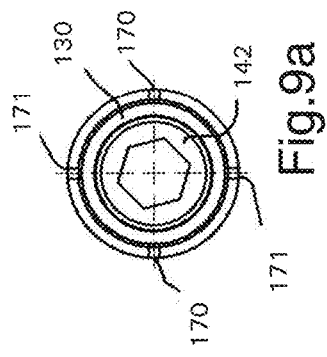
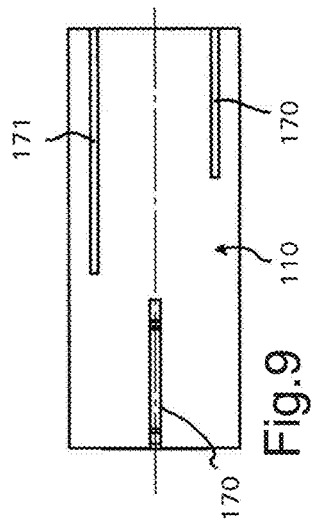
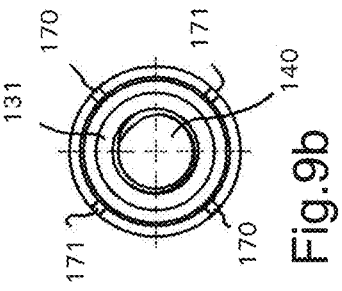
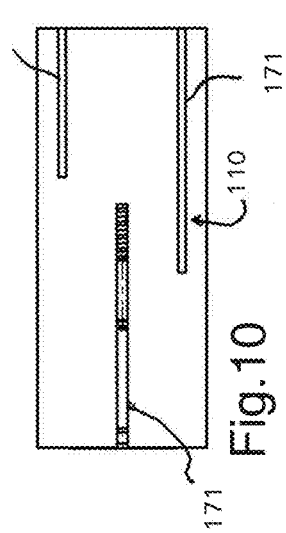
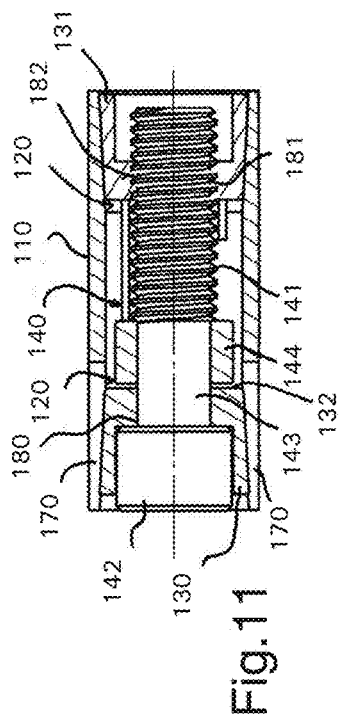

MOUNT FOR A WELDING GUN FOR CONNECTING SAID WELDING GUN TO AN ARM OF A WELDING ROBOT

BACKGROUND OF THE INVENTION

Technical Field

The present invention relates to a mount for a welding gun for connecting said welding gun to an arm of a welding robot having the features where the mount has a first connector for forming a connection with the robot arm and a second connector for forming a connection with the welding gun. In addition, it relates to an articulated joint for a mount for a welding gun, said articulated joint being formed between two rigid elements such that it can be pivoted around an axis of rotation and can be locked in a swivel position.

Background Information

In modern mass production, automatic welding machines or, respectively, welding robots, in particular such as those used in MIG and MAG welding, are frequently used for joining processes, especially for metal workpieces. Here, multi-axis robots are frequently used, which have robot arms that are suitably designed to move around movement axes, at the ends of which arms, welding guns (also referred to as welding torches) are attached. In the process, the welding guns are typically fixed to the respective robot arm by means of a mount, which mounts are fixed at a first attachment end to a fastening attachment of the robot arm, and are detachably connected at a second attachment end to the welding gun. These mounts are again used for the simple, interchangeable attachment of the welding gun, which as a rule must frequently be replaced, whether this is done to dispose a differently shaped welding gun when the welding robot is used in a modified manufacturing process, or whether this is done to replace a worn welding gun with a new welding gun. Corresponding mounts for welding guns are shown, for example in the Japanese publications, JP 2005324250 A and JP 2009-142922 A.

In addition to the easily performed interchangeable attachment of the welding gun to the robot arm, such mounts are regularly used for additional purposes. On the one hand, the mounts are shaped and guided in such a way that the welding gun can be disposed in such a way that when it is used to place weld points on a workpiece that are partially covered, the welding top of the welding gun can approach the corresponding positions on the workpiece. On the other hand, a shut-off mechanism for an emergency stop of the welding robot may be disposed on the mount for the event that it approaches the workpiece unintentionally, i.e. in the event of a collision of the welding gun and the workpiece. In addition, the mount may comprise a guide for a cable-hose assembly that is to be connected to the welding gun, which cable-hose assembly contains the lines for welding media that are to be supplied, such as electricity, gas, coolant and the welding rod.

An essential aspect in the design of the mount is the precision with which the welding tip of the welding gun is spatially oriented and in a defined ratio, corresponds to the TCP (Tool Center Point) or, respectively, defines the position of the TCP. A challenge is posed here, in particular when welding guns are to be replaced, since differently shaped welding guns bring with them a different TCP and the welding guns are frequently not manufactured so precisely, such that, when replacing a welding gun with a new welding gun of essentially the same design, the TCP may be slightly displaced. In automated welding, however, imprecision in the location of the TCP means a deviation in the position of the weld points that are placed, which can lead to problems and waste during the production.

Accordingly, there are solutions on the market, in which the mounts are not assembled from elements that are rigidly oriented relative to one another and frequently strut-shaped, but rather in which at least one, and frequently a plurality of, pivotal joints are provided, so that the individual rigid elements can be pivoted relative to one another in order to be able to make an adjustment to the orientation of the welding gun in the mount, and to be able to adjust the TCP accordingly. These articulated joints must be reliably fixed in their pivotal position after adjustment.

Herein lies the problem: In the previously envisaged solutions, fixing the corresponding articulated joints is time-consuming and often not sufficiently reliable. Accordingly, instead of mounts being equipped with the appropriate articulated joints, mounts are frequently available and distributed in the market that have modular designs comprising individual strut elements, wherein, in the case of a change to the structure, for example due to the replacement of a welding gun, individual elements that are connected to one another in a modular fashion, however precisely defined in terms of their position, must be replaced accordingly with elements that are specifically designed for a configuration using the respective welding torch. In addition to the complexity associated with making such a replacement, these solutions place a high demand on inventory, due to the need to stock up on the various components of the mounts having a modular design for the different applications, correspondingly costly mounts are also required, in particular different individual modules must be kept in stock, in order to form or, respectively, construct the different retaining geometries.

SUMMARY

The invention is intended for use in this case, and a corresponding simplification of such mounts is to be created. In particular, a mount for welding guns having at least one articulated joint that can be pivoted around an axis of rotation and fixed is to be refined such that this mount is of a simple design and the corresponding articulated joint can be reliably locked-off using simple means, and can likewise be reliably and simply released again for a reshaping of the mount by adjusting to a modified swivel position.

The invention achieves this object with a mount for a welding gun for connecting said welding gun to an arm of a welding robot where the mount has a first connector for forming a connection with the robot arm and a second connector for forming a connection with the welding gun and having at least one articulated joint provided between two rigid elements of the mount such that it can be pivoted around a first axis of rotation and locked in a swivel position, and wherein the articulated joint is formed having a sleeve that can be fixed to a first of the two rigid elements, said sleeve having an inner diameter and an outer diameter, and having a first bore with an inner diameter on the second of the rigid elements, wherein the sleeve is inserted into the first bore and the inner diameter of the first bore and the outer diameter of the sleeve are selected in such a way that the second rigid element can be turned with the first bore relative to the sleeve, wherein a first expansion element that can be displaced in the longitudinal direction of the sleeve is provided in the interior of the sleeve, which expansion element has a central opening, through which a tensioning bolt is passed, said bolt having a threaded section with an external thread and a bolt head, which abuts the first expansion element at a front end of the central opening, and wherein a support element is provided having an internal thread that corresponds to the external thread for the screwed mounting of the threaded section of the tensioning bolt, wherein screwing the tensioning bolt into the support element causes an expansion of the sleeve and thus causes the sleeve to be seized around the circumference thereof in the first bore, and wherein a means of release that works in conjunction with a stop is provided in order to neutralize an expansion of the sleeve and the seizing of the sleeve around the circumference thereof in the first bore that was triggered thereby. Advantageous refinements of such a mount are-that the support element is a first longitudinal section of the sleeve, which is provided within the sleeve, located behind the first expansion element when viewed from a first free end of the sleeve, said first longitudinal section having a central bore, which has the internal thread, said thread having a thread diameter that is smaller than the inner diameter of the sleeve.

Furthermore, the sleeve is a continuous sleeve, and a second bore, having an inner diameter that corresponds to the outer diameter, is provided in the first rigid element, wherein the inner diameter of the second bore and the outer diameter of the sleeve are selected in such a way that the first rigid element, having the second bore, can be turned relative to the sleeve, wherein a second longitudinal section is provided inside the sleeve, which second longitudinal section has an internal thread that is smaller as compared to the inner diameter of the sleeve, and wherein a second expansion element is provided inside the sleeve that is located in front of the second longitudinal section when viewed from a second free end of the sleeve, it being possible to displace said element in the longitudinal direction of the sleeve, which second expansion element has a central opening, through which a tensioning bolt is passed, said bolt having an external thread that corresponds to the internal thread of the second longitudinal section of the sleeve, and a bolt head, which abuts the second expansion element at a front end of the central opening located opposite the second longitudinal section of the sleeve. The first and the second longitudinal section of the sleeve are designed, connected together, having a single, continuous internal thread. The first and/or the second longitudinal section has the stop between the inner wall of the sleeve, limiting the inner diameter, and the internal thread that is transverse to the longitudinal extension of the sleeve, and in that an additional internal thread is disposed in the central opening of the first and/or second expansion element, said internal thread having a thread diameter which is larger than the thread diameter of the internal thread in the first longitudinal section of the sleeve that forms the support for screwing in a release bolt that forms the means of release, having an external thread that is larger than the internal thread in the central bore. Furthermore, the sleeve is a continuous sleeve and a second bore, having an inner diameter that corresponds to the outer diameter, is provided in the first rigid element, wherein the inner diameter of the second bore and the outer diameter of the sleeve are selected in such a way that the first rigid elements can be turned together with the second bore relative to the sleeve, wherein a second expansion element is disposed inside the sleeve located opposite the first expansion element, which has a central opening and an internal thread placed therein, which corresponds to the external thread of the tensioning bolt, wherein the second expansion element forms the support. The tensioning bolt on a section of its shank, which rests on a front surface of the first expansion element that is located opposite the front surface of the first expansion element, which abuts the bolt head, has a ledge, having an enlarged diameter, the diameter of which is larger than the central opening in the first expansion element and which has the stop on the side facing the first expansion element, wherein the tensioning bolt with the ledge simultaneously forms the means of release. Additionally, the first and/or the second expansion element has/have a conical circumferential shape, and in that, in the regions in which the first and/or the second expansion element is/are disposed, the sleeve has a conically shaped inner form corresponding to the conical circumferential shape of the respective expansion element. Still further, the sleeve is provided with longitudinal grooves in the wall of the sleeve at the first and/or the second free end. The mount may further have at least a second articulated joint between two rigid elements such that it can be rotated around a second axis of rotation and locked in a swivel position, which is designed in a combination of a sleeve that is fixed on the first of the rigid elements, and a bore in the second of the rigid elements. In addition, a solution for this object is also found in an articulated joint for a mount for a welding gun, said articulated joint being formed between two rigid elements such that it can be pivoted around an axis of rotation and locked in a swivel position, said articulated joint having a sleeve that is mounted on a first of the two rigid elements, said sleeve having an inner diameter and an outer diameter, and a first bore, having an inner diameter on the second of the rigid elements, wherein the sleeve is inserted into the first bore, and the inner diameter of the first bore and the outer diameter of the sleeve are selected in such a way that the second rigid element can be turned together with the first bore relative to the sleeve, wherein inside the sleeve, a first expansion element is provided that can be displaced in the longitudinal direction of the sleeve, which first expansion element has a central opening, through which a tensioning bolt is passed, said bolt having a threaded section with an external thread and a bolt head, which abuts the first expansion element at a front end of the central opening, and wherein a support element is provided having an internal thread that corresponds to the external thread for the screwed mounting of the threaded section of the tensioning bolt, wherein screwing the tensioning bolt into the support element causes an expansion of the sleeve and thus causes the sleeve to be seized around the circumference thereof in the first bore, and wherein a means of release that works in conjunction with a stop is provided in order to neutralize an expansion of the sleeve and the seizing of the sleeve around the circumference thereof in the first bore.

Advantageous refinements of such an articulated joint include that the support element is a first longitudinal section of the sleeve, which is provided within the sleeve located behind the first expansion element when viewed from a first free end of the sleeve, said first longitudinal section having a central bore, which has the internal thread, said thread having a thread diameter that is smaller than the inner diameter of the sleeve. The sleeve is a continuous sleeve, and a second bore, having an inner diameter that corresponds to the outer diameter, is provided in the first rigid element, wherein the inner diameter of the second bore and the outer diameter of the sleeve are selected in such a way that the first rigid element, having the second bore, can be turned relative to the sleeve, wherein a second longitudinal section is provided inside the sleeve, which second longitudinal section has an internal thread that is smaller as compared to the inner diameter of the sleeve, and wherein a second expansion element is provided inside the sleeve that is located in front of the second longitudinal section when viewed from a second free end of the sleeve, it being possible to displace said element in the longitudinal direction of the sleeve, which second expansion element has a central opening through which a tensioning bolt is passed, said bolt having an external thread that corresponds to the internal thread of the second longitudinal section of the sleeve, and a bolt head, which abuts the second expansion element at a front end of the central opening located opposite the second longitudinal section of the sleeve. Furthermore, the first and/or the second longitudinal section has the stop between the inner wall of the sleeve, limiting the inner diameter and the internal thread that is transverse to the longitudinal extension of the sleeve, and in that an additional internal thread is disposed in the central opening of the first and/or second expansion element, said internal thread having a thread diameter which is larger than the thread diameter of the internal thread in the first longitudinal section of the sleeve that forms the support for screwing in a release bolt that forms the means of release, having an external thread that is larger than the internal thread in the central bore. Still further, the sleeve is a continuous sleeve, and a second bore, having an inner diameter that corresponds to the outer diameter, is provided in the first rigid element, wherein the inner diameter of the second bore and the outer diameter of the sleeve are selected in such a way that the first rigid elements can be turned together with the second bore relative to the sleeve, wherein a second expansion element is disposed inside the sleeve located opposite the first expansion element, which has a central opening and an internal thread placed therein, which corresponds to the external thread of the tensioning bolt, wherein the second expansion element forms the support. Additionally, the tensioning bolt provided on a section of its shank, rests on a front face of the first expansion element that is located opposite the front face of the first expansion element, which abuts the bolt head, has a ledge having an enlarged diameter, the diameter of which is larger than the central opening in the first expansion element and which has the stop on the side facing the first expansion element, wherein the tensioning bolt with the ledge simultaneously forms the means of release.

In addition to the fact that here, at least one articulated joint is provided that can be pivoted about a first axis of rotation and can be fixed in a swivel position, what is special about the mount for a welding gun according to the invention is the design of this articulated joint. Specifically, this articulated joint has an especially simple design, and at the same time can thereby be reliably fixed and released in a simple manner. According to the invention, the articulated joint has a sleeve that is fixed on a first rigid element of the mount, a first free end of said sleeve being located in a bore in a second rigid element of the articulated joint. The inner diameter of the bore and the outer diameter of the sleeve are thereby designed in such a way that it is possible to turn the sleeve in the bore, and this thereby makes it possible to pivot the two rigid elements relative to one another. In so doing however, the inner diameter of the bore and the outer diameter of the sleeve are advantageously coordinated with one another in such a way that these diameters to not allow any substantial amount of play in the movement transverse to the longitudinal axis of the sleeve, and therefore to the axis of rotation of the articulated joint. The sleeve and bore are therefore advantageously wrought in terms of fit. To begin with, this configuration allows the articulated joint to have a very simple design, in which the sleeve defines the axis of rotation depending on the kind of articulated joint shaft.

In addition, the special design having a sleeve and an expansion element, which is mounted in the sleeve such that it can be displaced longitudinally, makes it possible to fix the articulated joint in a simple manner. To this end, the expansion element, having a tensioning bolt, which is passed through the central opening of this expansion element, and which meshes in the internal thread of a support element, is drawn in the direction of this support element and thus expands the sleeve, which results in a press fit, and thereby to a seizing around the circumference or, respectively, a friction locked fixing of the articulated joint.

The expansion element may have a conically shaped circumferential surface, for example, the tapered end of which faces the inside of the sleeve. The opening in the inside of the sleeve, which defines the seat of the expansion element, may have a corresponding conical shape so that an interaction occurs that expands the sleeve. In order to facilitate an expansion of the sleeve at the free end, longitudinal grooves (or if applicable, only one such groove) may be provided there.

This type of configuration of the articulated joint allows, firstly, the fixing of the articulated joint in any adjusted angle of the articulated joint. Unlike what occurs in the case of known gearing formed on articulated joint elements that are engaged in contact surfaces, for example in order to fix a jointed connection, which gearings mesh with one another, and which each allow only one angular adjustment about the dimensions of a gear tooth, the articulated joint of the mount according to the invention can be adjusted in any manner by turning the sleeve in the bore, and can then be reliably fixed by expanding the sleeve accordingly and creating surface pressure.

In order to prevent a situation in which the articulated joint can no longer be released once it has assumed a relative position and pivot position, thus in which the expansion element can no longer be moved back into the sleeve, a stop is provided according to the invention, which functions together with a means of release in order to neutralize an expansion of the sleeve, and therefore to release the seizing of the sleeve around the circumference thereof. This may be done in particular in that, together with the means of release and on the basis of its interaction with the stop, the expansion element is displaced in a direction in which that element is moved out of a position in which the sleeve is expanded.

The counter bearing element may be formed as a first longitudinal section of the sleeve in the inside thereof, which section has a smaller inner diameter than the inner diameter of the sleeve, and the internal thread therein.

For release by means of a means of release and a stop, the stop may thereby be formed in a section between the wall of the sleeve and the internal thread on the front surface of the first longitudinal section facing the expansion element, and an additional internal thread may be formed in the central opening of the expansion element, which additional internal thread has a diameter that is larger than the internal thread in the longitudinal section of the sleeve, in which internal thread the tensioning bolt engages, with which the expansion element may be drawn or, respectively, pressed into the interior of the sleeve. In order to release the position of the articulated joint, the tensioning bolt, with which the expansion element is drawn into the sleeve, can then be removed as a whole. If, in so doing, the expansion element is not yet released from its position, which expands the sleeve and seizes the articulated joint (as is frequently the case), a release bolt, which is formed in the central opening of the expansion element corresponding to the inner diameter of the thread, is screwed into the inner thread as a means of release, said release bolt having a larger diameter than this internal thread, until the front end thereof is braced against the stop. This occurs because the release bolt has an outer diameter and also thread diameter that are larger than the inner diameter of the internal thread of the first longitudinal section. By screwing the release bolt, which is braced against the first stop, further into the central opening of the expansion element, the latter is now forced in the direction of the open, free end of the sleeve from its position which caused the expansion of the sleeve and thereby the surface pressure, so that the sleeve again returns to a normal position and the articulated joint is reliably unlocked.

Alternatively, it is also possible to design the stop as a ledge having an enlarged diameter, which is which is passed around the shaft of the tensioning bolt on a front surface of the expansion element located opposite the front surface of the tensioning element, which is abutted by the bolt head, so that the tensioning bolt itself is the means of release, in that, when a tensioning bolt is screwed out of the support, the stop comes into contact with the ledge on the expansion element, and thus, as a result of the further release of the tensioning bolt between the support element and the expansion element, a force is exerted that forces these apart, which ultimately leads to a release of the clamping.

The one essential component of the sleeve that forms the articulated joint can thereby be fixedly molded on the first rigid element of the articulated joint, for example as a single piece or welded thereto, however it may also be designed as a continuous sleeve and basically a loose element of the articulated joint, and may be passed through corresponding bores in both rigid elements, thereby connecting those elements. The result is an embodiment of the invention wherein, in the process, corresponding expansion elements are inserted into the free ends of the sleeve, which are located opposite one another, and with appropriate screwing, are braced therein in the longitudinal sections of the sleeve or, respectively, in the second expansion element that serves as a support element towards the center of the sleeve so that the sleeve is seized and fixed in both bores of the rigid elements involved by means of an appropriate spreading.

In this configuration, corresponding central openings having internal threads may then be provided in both expansion elements, the diameter of which is larger than the internal thread in the longitudinal sections, so that, after unscrewing the tensioning bolts by screwing in the release bolts, which are supported on the stops formed in the longitudinal sections, both expansion elements can be released from their clamped position in the manner described above, and thus the articulated joint is released with an option to rotate both rigid elements relative to the sleeve.

In particular when the support is formed by a central section, the sleeve may then have a continuous central section, in which a continuous opening having a continuous internal thread is disposed, in which thread the tensioning bolts mesh from both sides. Particularly advantageously, in so doing, the sleeve may be formed such that it is symmetrical to a central plane, which is perpendicular to the longitudinal axis. The design of the sleeve having expansion elements, of which one is the support, and thus has the internal thread in which the tensioning bolt meshes, is able to create a secure interlocking of the articulated joint even with only one tensioning bolt, in particular since, due to a floating mounting of the two expansion elements, these are drawn together with evenly distributed force, this distribution of force adjusting itself automatically when tightening the tensioning bolt.

In the described solution as well, having one of the expansion elements as a support element, the central opening in the other expansion element, that does not serve as a support element, may have an internal thread has a larger diameter, into which a release bolt may be screwed, which may then be supported on the front surface of the expansion element that forms the stop, which expansion element serves as a bearing element. A solution having an above described ledge on the shank of the tensioning bolt is preferred here, however, due to the ease of handling.

As already stated above, an essential feature of the mount according to the invention is the articulated joint, which is accordingly designed as described above having the advantages described, which accordingly represents a distinct aspect of the invention.

BRIEF DESCRIPTION OF THE FIGURES

Further advantages and features of the invention will become apparent from the following description of embodiments with reference to the accompanying Figures. Shown are:

FIG. 4 a sectional cutaway view of the configuration according to FIG. 1, wherein longitudinal section through one of the articulated joints is shown;

FIG. 5 a three-dimensional representation of the configuration comprising a slotted sleeve having expansion elements disposed therein, which is an essential component of an articulated joint of the mount according to the invention pursuant to the embodiment;

FIG. 9 a side view comparable to that in FIG. 7 of the configuration comprising a slotted sleeve, having expansion elements (not shown in greater detail in this view) disposed therein as essential components of an articulated joint according to the invention, in a second embodiment;

FIGS. 9a and 9b each showing a view of the front surfaces located opposite on another of the configuration pursuant to FIG. 9;

FIG. 10 a view comparable to that in FIG. 9, having a sleeve rotated 90° around the longitudinal axis thereof; and FIG. 11 a cross-sectional view through a configuration pursuant to FIG. 9 or, respectively, 10 of the second exemplary embodiment in order to illustrate the construction and to explain the mode of operation of the essential components of an articulated joint according to the second exemplary embodiment.

Exemplary embodiments of a mount according to the invention having an articulated joint according to the invention are shown in the Figures and described below. In so doing, the figurative representations are neither to scale, nor accurate in all aspects of every detail. Rather, they are limited to the depiction of the essential elements and their interaction that are essential to understanding the invention.

DETAILED DESCRIPTION

Figure 1:
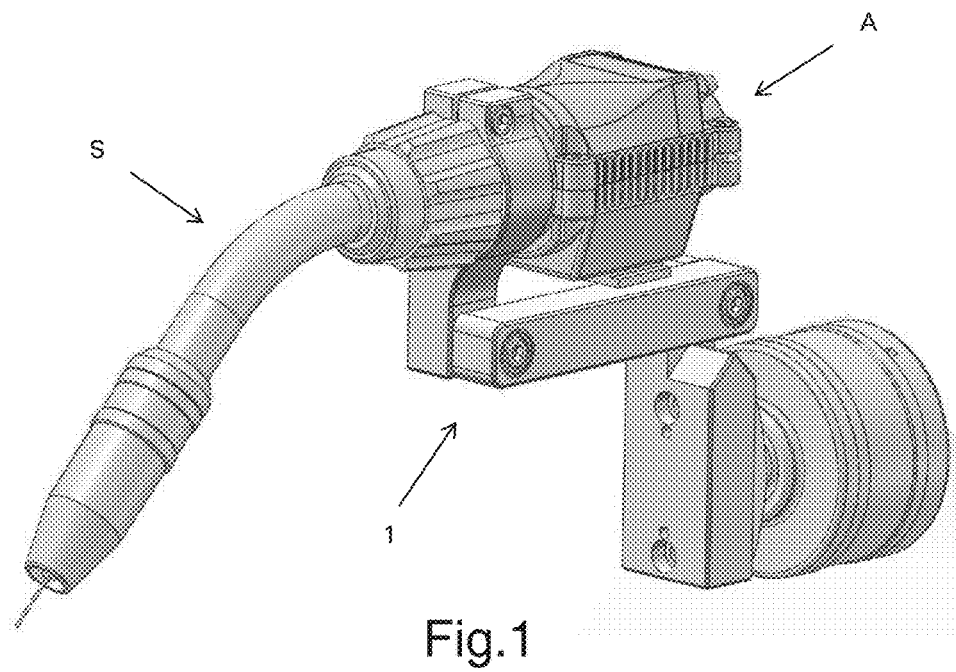
FIG. 1 a three-dimensional view of a mount according to the invention, having a welding gun held therein, in one possible embodiment.
Figure 2:
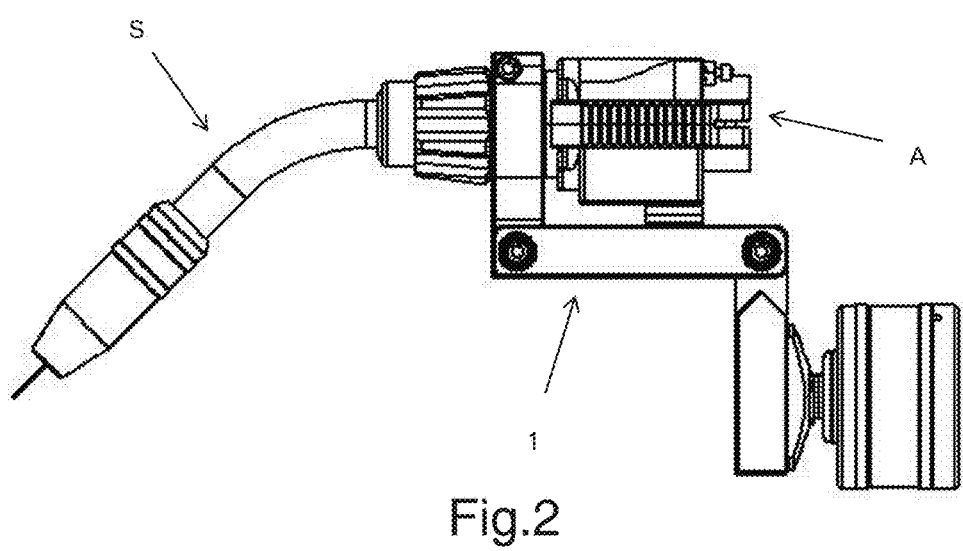
FIG. 2 the configuration according to FIG. 1 in a side view.

FIGS. 1 and 2 show two illustrations of a configuration comprising a mount according to the invention in two different views; to begin with, a three-dimensional view in FIG. 1 and a side view in FIG. 2, which are labeled there with the reference numeral 1, and illustrating a welding gun S held in the mount 1. In the case of the welding gun S, it is a welding gun such as those that are used for MIG/MAG welding processes. The welding gun S in this exemplary embodiment is held in an O-shaped retaining ring, which is opened on one side by a slit, which slit is bridged by a bolt for reducing the inner diameter of the retaining ring and for the clamping and clamped fixing of the welding torch S. This type of fastening is well known and need not be explained here in greater detail.

At a rear end, the welding gun S has a connector A for connection to a so-called cable-hose assembly for the supplying of welding media, thus the welding rod, as well as the welding gas and the welding current, and possibly cooling water in the case of a water-cooled welding gun S. The cable-hose assembly is not shown here, nor is the robot arm shown, to which the mount 1 is attached in a manner that will be explained in greater detail with reference to FIG. 3.

Figure 3:
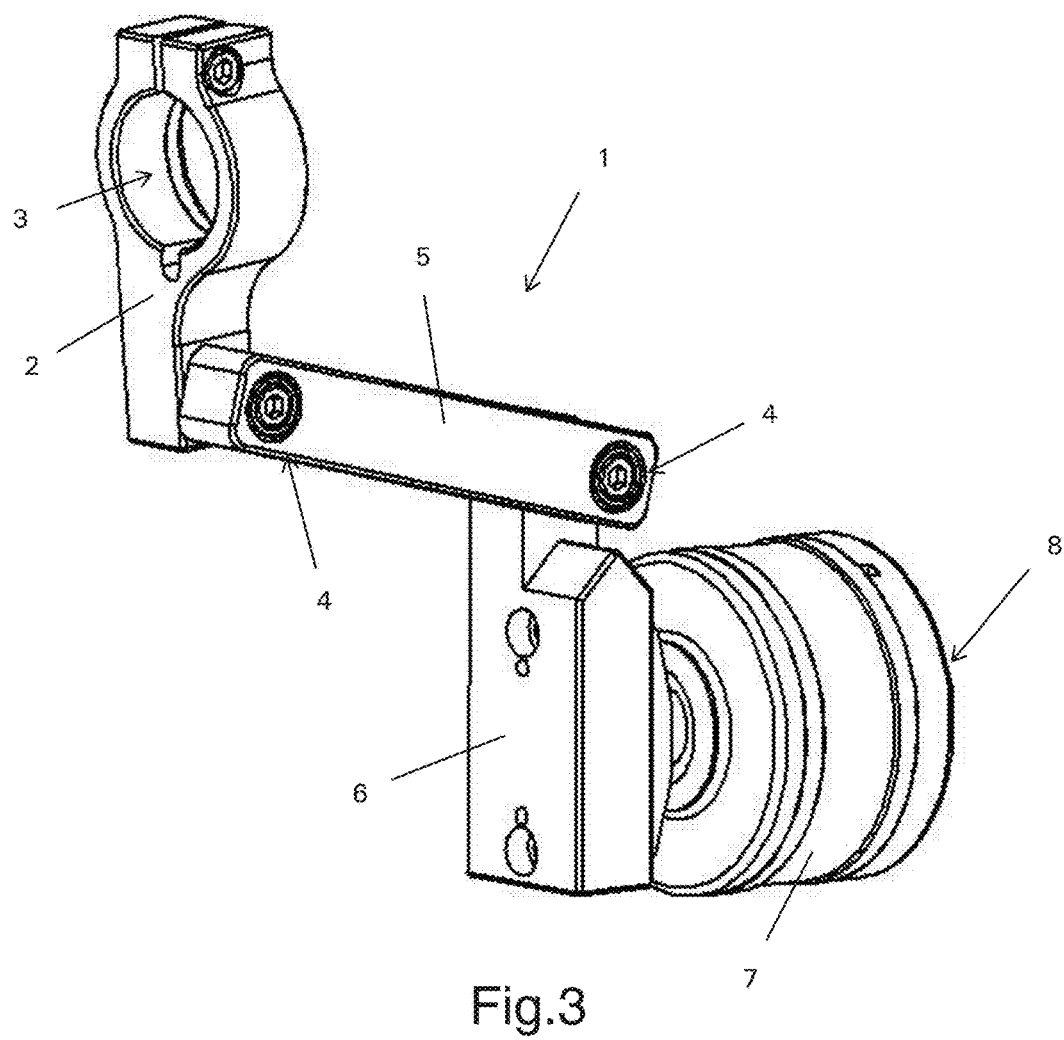
FIG. 3 the exemplary embodiment of a mount according to the invention illustrated in FIGS. 1 and 2 without a welding gun.

FIG. 3 shows the mount 1 from the preceding illustrations without the welding gun S clamped therein, wherein the articulated joints that will be described in greater detail below, are in a different orientation. To begin with, it can be seen that the mount 1 has a coupling element 2, which forms the retaining ring described above and labeled with reference numeral 3, into which the welding gun is inserted, and in which the welding gun is held by means of clamping, and seized. The coupling element 2 is connected to a center brace 5 by means of an articulated joint 4. The articulated joint 4 allows a pivoting between the coupling element 2 and center brace 5 around an axis of rotation. An additional articulated joint 4 is formed on a longitudinal end of the center brace 5, which is located across from the articulated joint 4 formed between the coupling element 2 and the center brace 5. A tilt angle between the center brace 5 and the connecting brace 6 can be adjusted by means of this articulated joint 4. The connecting brace 6, on the other hand, is connected to an emergency shutdown 7, which allows an elastic deflection of the mount 1 in the event of a collision with a workpiece, for example, which in such an event effects and triggers an emergency shutdown of the supply of welding media, in particular the welding current, to the welding gun S regulated by corresponding micro-switches or the like. The emergency shutdown S has a connection flange 8 at a rear end, with which the mount 1 can be fixed to a robot arm (not shown here) of a multi-axis robot.

As is already evident by comparing FIG. 1 or, respectively, 2 with FIG. 3 the articulated joints 4 allow the orientation and shape of the mount to be freely selected by a free pivoting of the coupling element 2 relative to the center brace 5 or, respectively, the center brace 5 relative to the connecting brace 6. In so doing, the articulated joints 4 are oriented in such a way that they not only make freely predefinable pivoting, in which the pivot angle is non-incremental, possible, but they also make it possible to securely fix the articulated joint in a swivel position that has been previously engaged and selected.

The structure of possible embodiments of articulated joints according to the invention will now be explained in greater detail with reference to the following illustrations and description for FIGS. 4 to 8 (first exemplary embodiment) and 9 to 11.

FIG. 4 shows a cutaway section of the mount 1 having a welding gun S held therein and a longitudinal section through the articulated joint 4 formed between the coupling element 2 and the center brace 5, according to a first exemplary embodiment. It can be seen that in the coupling element 2, a bore 9 that cuts through this element is formed, and, as it were, a bore 10 having the same diameter is formed in the center brace 5. A sleeve 11 is used in both bores 9, 10, which has an outer diameter that corresponds to the inner diameters of the bores 9 and 10, which fits in the bore but which is seated with sufficient play that this allows the coupling element 2 to be pivoted relative to the center brace 5 around the axis of rotation defined by the longitudinal axis of the sleeve 11.

According to this exemplary embodiment, the sleeve 11 is formed mirror symmetrically in the articulated joint in a mid-plane perpendicular to the longitudinal axis thereof, and mounting spaces 12 are formed at both ends, which mounting spaces have circumferential walls that taper conically from the respective outside of the sleeve 11 towards the inside thereof. A cup-shaped expansion element 13, which has a conical outer contour that corresponds to the conical form of the wall of the mounting space 12, and which can be moved in the longitudinal direction of the sleeve 11, is inserted into each of the mounting spaces 12. Tensioning bolts 14 with their threaded rod sections are passed through central openings in the expansion elements 13, which tensioning bolts 14 mesh in a central bore 16 placed in the central longitudinal section 15 and internal thread formed therein. By screwing the tensioning bolts 14 into the internal thread of the central bore 16, the expansion elements 13, with their conical external form, are drawn in the direction of the central longitudinal section 15 and expand the outer wall of the sleeve 11 at the respective front surface, which, facilitated by longitudinal grooves 17 placed in a longitudinal direction on this respective front face (see FIG. 5), deform outward with an enlargement of the diameter thereof and press against the inside of the respective bore 9 or, respectively, 10 in the coupling element 2 or, respectively, the center brace 5, and thus form a friction-locked connection. Through the configuration, each case, of a tensioning bolt 14 or, respectively, of an expansion element 13 at each of the two front faces of the sleeve 11, which element is to be tensioned in the sleeve 11 by means of that tensioning bolt, a very defined application of force is possible, so that a defined and reliable fixed positioning of the articulated joint 4 is possible.

Figure 6:
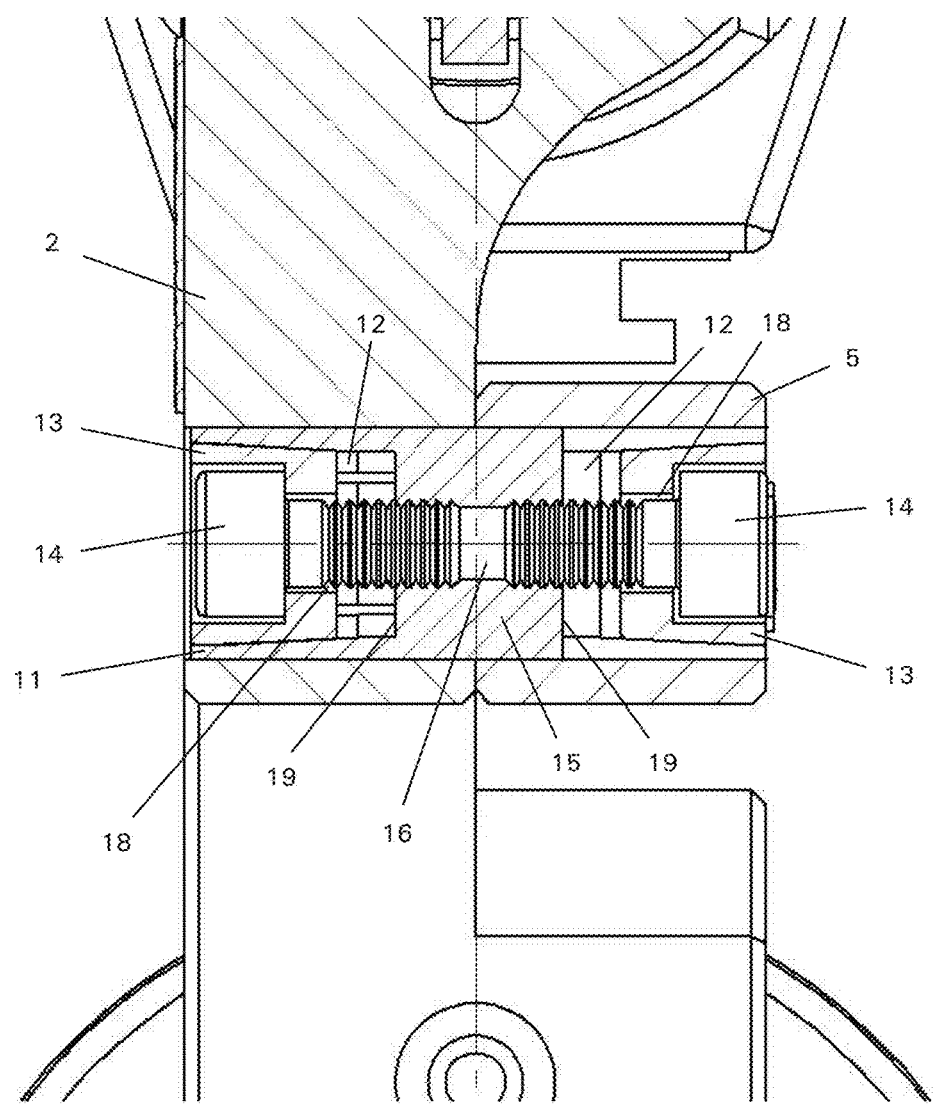
FIG. 6 a top view of a cross-sectional view comparable to that in FIG. 4, to further illustrate the construction of the articulated joint.
Figure 7A:
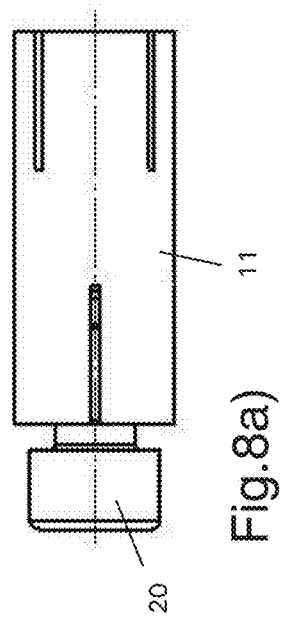
FIG. 7 a side view (FIG. 7a) as well as a longitudinal sectional view (FIG. 7b) of the configuration shown in FIG. 5, in a tensioned state for fixing the sleeve in the bores and for blocking the articulated joint.

This situation is shown again for better comprehension in FIG. 6, in a similar cross-sectional view to that which was shown in FIG. 4. It is clearly evident here that in the articulated joint according to this first exemplary embodiment, the tensioning bolts 14 are passed through elements 13 and central openings 18 having diameters that correspond in size, without resting thereon. In addition, stop surfaces or, respectively, stops 19 can be seen in this illustration, each of which are formed on the inner end of the mounting spaces 12 at the transition to the longitudinal section 15, and extend essentially perpendicular to the longitudinal extension of the sleeve 11.

FIGS. 7a and b again show, in individual depictions, the one essential component of the sleeve 11 that forms the articulated joints 4 according to the first exemplary embodiment (see FIG. 3) and the interior of that sleeve. The longitudinal grooves 17 are clearly visible in FIG. 7, which shows a depiction of a side view, which are placed in the sleeve starting from the two free ends thereof, and extending in a longitudinal direction over a distance of slightly more than ⅓ of the length thereof. A total of four longitudinal grooves 17 are disposed on each of the front surfaces along the circumference, spaced 90° apart from one another, as can clearly be seen in FIG. 5 in particular. In order to prevent an excessive weakening of the material of the sleeve 11, the longitudinal grooves 17 are disposed at the longitudinal ends along the circumference such that they are offset, in this case by 45°.

FIG. 7b again shows the situation inside the sleeve 11 in a longitudinal sectional view. Again, it is evident here how the heads of the tensioning bolts 14 rest inside the cup-shaped expansion elements 13, and pull these expansion elements in the direction of the center of the sleeve 11, when the tensioning bolts are tightened in the inner thread formed in the central bore in the middle longitudinal section 15 of the sleeve 11, and therefore cause an expansion of the sleeve 11 at the ends, thereby causing the sleeve 11 to be clamped in the bores 9 or, respectively, 10 of the retaining section 2 or, respectively, of the center brace 5.

Figure 8A:
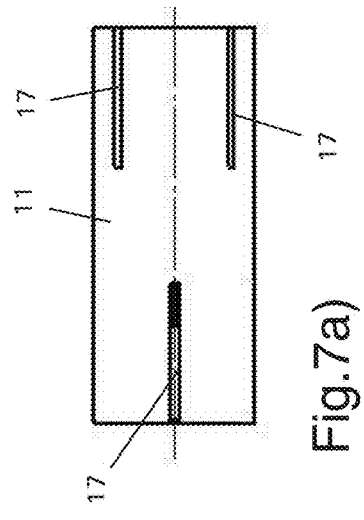
FIG. 8 illustrations 8a and 8b, which are comparable to FIGS. 7a and b, of the sleeve having a release bolt, which illustrated at the left of each of the Figures, said release bolt being inserted into the expansion element to release the expansion element from its braced or, respectively, clamped position.
Figure 7B:
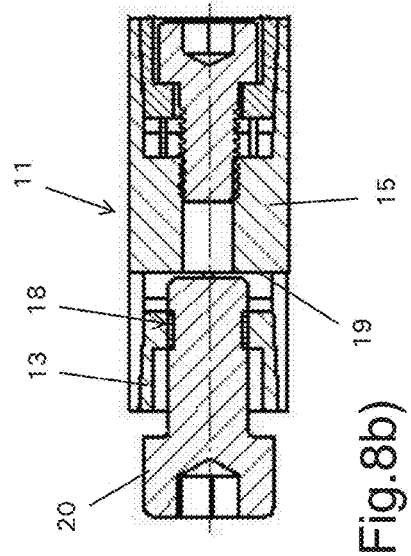
Figure 8B:
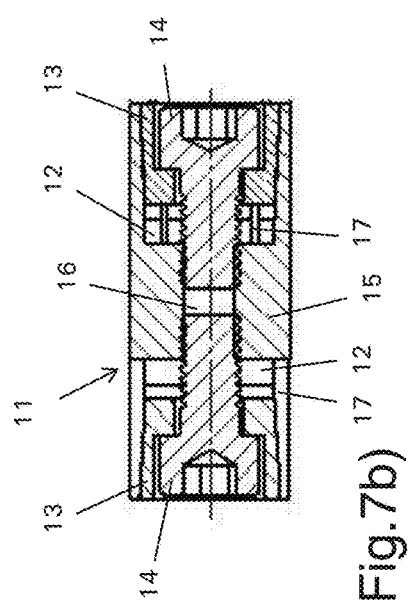

Since, due to the interaction of the conical region of the inner wall of the sleeve 11 in the mounting spaces 12 with the outer wall of the expansion element 13, the expansion elements 13 each become wedged in the tensioned position expanding the sleeve 11, thus creating a clamping connection and despite the release of the tensioning bolts 14, and cannot readily be moved back and release the interlocking position of the articulated joint, an additional internal thread is provided in each expansion element 13 in the central opening 16, which inner thread has a diameter that is larger than the internal thread in the central opening 16 in the central longitudinal section 15. This internal thread does not function together with the thread of the tensioning bolts 14, which, for example, might concern M6 gauge bolts, however it allows a release bolt 20 having a larger diameter, for example an M8 gauge thread, to be screwed in. This situation is shown in FIGS. 8a and b, in which it can be seen that such a release bolt 20 is screwed into the central opening of the expansion element 13 on the side shown on the left in each of the Figures. Due to the larger diameter of the screw thread of the release bolt 20, this bolt cannot mesh in the central opening 16 and the internal thread provided there in the central longitudinal section 15 of the sleeve 11, but rather the front surface of that bolt bumps up against the stop 19 and is supported there. If the release bolt 20 is now screwed further into the thread of the opening 16, the expansion element 13 is thereby displaced in the direction of the free end of the sleeve 11 and releases the free end of the sleeve 11 so that it can spring back, so that the clamping is released and the articulated joint can be unlocked.

It goes without saying that not only the articulated joint 4 between the coupling element 2 and the center brace 5 can be designed in the manner described above, but likewise the articulated joint 4 between the center brace and the connecting brace 6.

FIGS. 9 to 11 show different views of a core of an articulated joint according to the invention in a configuration that forms a second embodiment comprising a sleeve with corresponding inner workings.

This configuration also has a sleeve 110, which, in order to form an articulated joint 4 according to the illustrations in FIGS. 1 to 3 or, respectively, analogous to the illustration in FIG. 4, is seated with a precise fit in the corresponding bores of the elements involved, however with sufficient play that, in an non-seized state, it is possible to turn the elements with the bores about the longitudinal axis of the sleeve, which at the same time is the articulated joint axis.

As can be seen in FIG. 11, two expansion elements 130 and 131 that are formed having conical circumferential surfaces are disposed inside the sleeve 110, said expansion elements each inserted into the sleeve 110 at front surfaces of the sleeve that are located opposite one another. These expansion elements 130, 131 are seated in mounting spaces 120 at the end surfaces of the sleeve 110, said mounting spaces having corresponding complementary conically shaped inner surfaces. The two expansion elements 130, 131 differ in this embodiment in that the central opening 180 of the expansion element 130 has smooth walls, and a central opening 181 is provided in the expansion element 131 having an internal thread 182.

In the position shown in FIG. 11, a tensioning bolt 140, having its external thread 141 placed at the end of the screw shank 143, is screwed into the corresponding internal thread 182 in the expansion element 131. The bolt head 142 of the tensioning bolt 140 is seated on the expansion element 130. If the external thread 141 of the tensioning bolt 140 is screwed into the internal thread 182 of the expansion element 131, the two floating-mounted expansion elements 130, 131 are drawn toward one another in the direction of the middle of the sleeve 110. Through the interaction of the conical circumferential surfaces of the expansion elements 130, 131 with the corresponding conical mating surfaces of the mounting spaces 120 in the sleeve 110, which expand the sleeve at the axial ends thereof, the clamping effect is created, as already described in the exemplary embodiment above, with which clamping effect the articulated joint is locked, said articulated joint being fitted with an assembly pursuant to the exemplary embodiment shown in FIGS. 9 to 11.

As in the preceding embodiment, the longitudinal grooves 170, 171, which cut through the walls of the sleeve from the front surfaces of the sleeve 110, support an expansion of the sleeve at the respective end regions at the front surfaces thereof. In this exemplary embodiment, longitudinal grooves of different lengths are provided, while the longitudinal grooves 170, like the longitudinal grooves 17 in the preceding exemplary embodiment, extend approximately a third of the length of the entire sleeve, and longitudinal grooves 171 are provided that extend over more than half of the length of the length of the sleeve. Four longitudinal grooves 170 and 171 are introduced extending from each front surface of the sleeve, which grooves are offset from one another by 90°. A shorter longitudinal groove 170 and a longer longitudinal groove 171 are thereby placed, consistently alternating with one another in the circumferential direction, so that the short longitudinal grooves 170 lie diametrically opposite one another, and likewise the long longitudinal grooves 171. These configurations of longitudinal grooves are formed such that they are displaced from one another or, respectively, rotated around the longitudinal axis of the sleeve of the sleeve 110 by 45° at opposite longitudinal ends. In this way, the expansion of the sleeve is facilitated, in particular by means of the elongated longitudinal grooves 171, wherein the configuration of the longitudinal grooves as described ensures that a sufficient amount of material of the wall of the sleeve remains, especially in the center of the sleeve, that there is no risk that the sleeve will break or that shearing will occur as a result of the torque applied when securing the tensioning bolt 140.

Finally, it is evident from FIG. 11 that a ledge 144 is formed on the shank 143 of the tensioning bolt 140 in a region that is not provided with the external thread 141, and on the front surface of the expansion element 130 located opposite the bolt head 142. In this exemplary embodiment, this ledge is formed by a press sleeve, which is which is applied to the shank of the tensioning bolt 140, and crimped on the shank 143 of the tensioning bolt for a firm seating.

A release of the clamped articulated joint connection is achieved by means of this ledge 144. Namely, when the tensioning bolt 140 is unscrewed from the internal thread 182 of the expansion element 131 in order to release the connection, the front surface of the stop 144 facing the bolt head 142 bumps up against a surface formed by the inside front surface of the expansion element 130, which surface forms a stop 132, so that in the case that the tensioning bolt 142 is further unscrewed and released, a force that pushes the two expansion elements 130 and 131 apart from one another is thereby applied so that at least one of the expansion elements 130 and 131 is released from the wedged position and this element is therewith relaxed out of the expanded position, at least at one end of the sleeve 110, and therefore again rests such that it can be freely rotated in the respective bore of the rigid element of the articulated joint that is involved, so that the articulated joint can be moved accordingly.

This is a further advantage in that, in the exemplary embodiment shown here, a separate means of release, such as the release bolt 20 in the exemplary embodiment described above, is not needed, since, in this exemplary embodiment, the tensioning bolt 140 simultaneously takes on the role of the means of release due to the configuration with the ledge 144.

Of course it is also possible to provide a corresponding configuration of the tensioning bolt 14 in the initially described exemplary embodiment, and thus to also achieve a corresponding advantage in this exemplary embodiment as well.

With the mount shown here and, in particular, the special articulated joint connection having the structure described above, a simple articulated joint connection that is easy to lock is described, which makes it possible to flexibly adjust and reliably fix the variable mount 1, for example in order to adapt the mount 1 to welding torches S having different geometries received therein, but also to realign the TCP. In the first exemplary embodiment, the option of screwing a release bolt 20 into the internal thread of the central opening 18 in the expansion element 13 makes a reliable and secure release of the articulated joint connection possible, even when the tapering of the surfaces involved, the outer surface of the expansion element 13 and the inner surface of the sleeve 11 in the mounting space 12, in interacting with the applied compression pressure, does not allow a simple release without the application of pressure, as can otherwise be observed, for example, in the angles of taper in the range of 2° to 6°, in particular 3°, which are used here. In the case of identical angles of taper and the associated possible clamping effect, in the second described exemplary embodiment, the ledge 144 on the tensioning bolt 140 provides the forced release of at least one of the expansion elements 130, 131 and thus a release of the sleeve 110 from the clamped position.

The mount according to the invention, having the special articulated joints, is therefore also conceived in such a way that it can have a modular design, with the option of a quick and easy exchange, for example, of the center brace 5, which can be designed in different lengths, or which may have bends or tilts, in order to implement specific geometries here, for example, in order to adapt to specific welding guns.

The connection to the welding gun S, which is shown here in the form of the retaining ring 3, may also be formed having an extension, which extension is permanently formed directly on the welding gun, and which is provided with a corresponding bore for the accommodation of the sleeve 11 or, respectively 110, and the formation of the articulated joint 4 (or having a fixedly formed sleeve in order to introduce a corresponding bore in an additional element, for example, the extension provided on the center brace 5). Within the meaning of this invention, such an extension is also a component of the mount and may form one of the rigid elements of the mount, which are connected to one another by means of a corresponding articulated joint.

The above description of the exemplary embodiment is not limiting to the invention, but merely represents one possible design and implementation variant of the invention. In particular, as already indicated, it is possible to not insert the sleeve 11 or, respectively, 110 in bores in both rigid elements of the mount involved, but rather to design the sleeve as an element that is fixed on one side to one of the elements, wherein the combination of tensioning bolt and expansion element is then only disposed on the side with the free end of the sleeve that is fixedly formed on the additional element, inside the same. Other configurations are conceivable, for example, a mount having only one articulated joint, designed in a manner according to the invention, or such a mount having even more rigid elements connected to corresponding articulated joints.

REFERENCE CHARACTERS 1 mount
2 coupling element
3 retaining ring
4 articulated joint
5 center brace
6 connecting brace
7 emergency shutdown
8 connection flange
9 bore
10 bore
11 sleeve
12 mounting space
13 expansion element
14 tensioning bolt
15 longitudinal section
16 central bore
17 longitudinal groove
18 opening
19 stop
20 release bolt
110 sleeve
120 mounting space
130 expansion element
131 expansion element
132 stop
140 tensioning bolt
141 external thread
142 bolt head
143 shank 144 ledge
180 central opening
181 central opening
182 internal thread
170 longitudinal groove
171 longitudinal groove
A connector cable-hose assembly
S welding gun

The invention claimed is:

1. A mount for a welding gun for connecting the welding gun to an arm of a welding robot having a first connector for forming a connection with the robot arm and a second connector for forming a connection with the welding gun and having at least one articulated joint provided between two rigid elements of the mount such that the joint is pivotable around a first axis of rotation and locked in a swivel position, wherein the articulated joint is formed having a sleeve that is fixable to a first of the two rigid elements, said sleeve having an inner diameter and an outer diameter, and having a first bore with an inner diameter on the second of the rigid elements, wherein the sleeve is inserted into the first bore and the inner diameter of the first bore and the outer diameter of the sleeve are selected in such a way that the second rigid element is turnable with the first bore relative to the sleeve, wherein a first expansion element displaceable in the longitudinal direction of the sleeve is provided in the interior of the sleeve, which first expansion element has a central opening through which a tensioning bolt is passed, said tensioning bolt having a threaded section with an external thread and a bolt head, wherein the bolt head abuts the first expansion element at a front end of the central opening, and wherein a support element is provided having an internal thread that corresponds to the external thread for the screwed mounting of the threaded section of the tensioning bolt, wherein screwing the tensioning bolt into the support element causes an expansion of the sleeve and thus causes the sleeve to be seized around the circumference thereof in the first bore, and wherein a means of release that works in conjunction with a stop is provided in order to neutralize an expansion of the sleeve and the seizing of the sleeve around the circumference thereof in the first bore that was triggered thereby.

2. The mount according to claim 1, wherein the support element is a first longitudinal section of the sleeve, wherein the first longitudinal section is provided within the sleeve and is located behind the first expansion element when viewed from a first free end of the sleeve, said first longitudinal section of the sleeve having a central bore, wherein the central bore has the internal thread, said internal thread having a thread diameter that is smaller than the inner diameter of the sleeve.

3. The mount according to claim 2, wherein the sleeve is a continuous sleeve, and a second bore having an inner diameter that corresponds to the outer diameter of the sleeve is provided in the first rigid element, wherein the inner diameter of the second bore and the outer diameter of the sleeve are selected in such a way that the first rigid element is turnable relative to the sleeve, wherein a second longitudinal section is provided inside the sleeve and the second longitudinal section has an internal thread that is smaller than the inner diameter of the sleeve, and wherein a second expansion element is provided inside the sleeve that is located in front of the second longitudinal section when viewed from a second free end of the sleeve, it being possible to displace said second expansion element in the longitudinal direction of the sleeve, wherein the second expansion element has a central opening, through which the tensioning bolt is passed, said tensioning bolt having an external thread that corresponds to the internal thread of the second longitudinal section of the sleeve and a bolt head that abuts the second expansion element at a front end of the central opening located opposite the second longitudinal section of the sleeve.

4. The mount according to claim 3, wherein the first longitudinal section of the sleeve and the second longitudinal section of the sleeve are connected together, having a single, continuous internal thread defined therein.

5. The mount according to claim 2, wherein the first and/or the second longitudinal section has the stop between the inner wall of the sleeve and the internal thread that is transverse to the longitudinal extension of the sleeve, and in that an additional internal thread is disposed in the central opening of the first and/or second expansion element, said additional internal thread having a thread diameter which is larger than the thread diameter of the internal thread in the first longitudinal section of the sleeve, wherein the additional internal thread forms a support for screwing in a release bolt that forms the means of release, said release bolt having an external thread that is larger than the internal thread in the central bore.

6. The mount according to claim 2, wherein the tensioning bolt on a section of the shank of the tensioning bolt, has a ledge of an enlarged diameter, the diameter of the ledge being larger than the central opening in the first expansion element and the ledge has the stop on the side facing the first expansion element, wherein the tensioning bolt with the ledge simultaneously forms the means of release.

7. The mount according to claim 1, wherein the sleeve is a continuous sleeve and a second bore, having an inner diameter that corresponds to the outer diameter of the sleeve, is provided in the first rigid element, wherein the inner diameter of the second bore and the outer diameter of the sleeve are selected in such a way that the first rigid elements is turnable together with the second bore relative to the sleeve, wherein a second expansion element is disposed inside the sleeve located opposite the first expansion element, and the second expansion element has a central opening and an internal thread placed therein that corresponds to the external thread of the tensioning bolt, wherein the second expansion element forms the support element.

8. The mount according to claim 7, wherein the first and/or the second expansion element has/have a conical circumferential shape, and in a region of the sleeve in which the first or the second expansion element is disposed, the sleeve has a conically shaped inner form corresponding to the conical circumferential shape of the respective first or second expansion element.

9. The mount according to claim 1, wherein the sleeve is provided with longitudinal grooves in the wall of the sleeve at a first free end or a second free end of the sleeve.

10. The mount according to claim 1, further comprising at least a second articulated joint between two rigid elements such that the second joint is rotatable around a second axis of rotation and locked in a swivel position, wherein the second articulated joint includes a combination of a sleeve that is fixed on the first of the rigid elements, and a second bore in the second of the rigid elements.

11. An articulated joint for a mount for connecting a welding gun to an arm of a welding robot, said articulated joint being formed between two rigid elements such that the joint is pivotable around an axis of rotation and is lockable in a swivel position, said articulated joint having a sleeve that is mounted on a first of the two rigid elements, said sleeve having an inner diameter and an outer diameter, and a first bore having an inner diameter on the second of the rigid elements, wherein the sleeve is inserted into the first bore, and the inner diameter of the first bore and the outer diameter of the sleeve are selected in such a way that the second rigid element is turnable together with the first bore relative to the sleeve, wherein inside the sleeve, a first expansion element is provided that is displaceable in the longitudinal direction of the sleeve, which first expansion element has a central opening, through which a tensioning bolt is passed, said tensioning bolt having a threaded section with an external thread and a bolt head, and the bolt head abuts the first expansion element at a front end of the central opening, and wherein a support element is provided having an internal thread that corresponds to the external thread for the screwed mounting of the threaded section of the tensioning bolt, wherein screwing the tensioning bolt into the support element causes an expansion of the sleeve and thus causes the sleeve to be seized around the circumference thereof in the first bore, and wherein a means of release that works in conjunction with a stop is provided in order to neutralize an expansion of the sleeve and the seizing of the sleeve around the circumference thereof in the first bore.

12. The articulated joint according to claim 11, wherein the support element is a first longitudinal section of the sleeve, and the first longitudinal section of the sleeve is provided within the sleeve located behind the first expansion element when viewed from a first free end of the sleeve, said first longitudinal section of the sleeve having a central bore which has the internal thread, said thread having a thread diameter that is smaller than the inner diameter of the sleeve.

13. The articulated joint according to claim 12, wherein the sleeve is a continuous sleeve, and a second bore, having an inner diameter that corresponds to the outer diameter of the sleeve is provided in the first rigid element, wherein the inner diameter of the second bore and the outer diameter of the sleeve are selected in such a way that the first rigid element, having the second bore, is turnable relative to the sleeve, wherein a second longitudinal section is provided inside the sleeve, wherein the second longitudinal section has an internal thread that is smaller than the inner diameter of the sleeve, and wherein a second expansion element is provided inside the sleeve and the second expansion element is located in front of the second longitudinal section when viewed from a second free end of the sleeve, it being possible to displace said second expansion element in the longitudinal direction of the sleeve, wherein the second expansion element has a central opening through which a tensioning bolt is passed, said tensioning bolt having an external thread and a bolt head; and wherein the external thread of the tensioning bolt corresponds to the internal thread of the second longitudinal section of the sleeve, and wherein the bolt head abuts the second expansion element at a front end of the central opening located opposite the second longitudinal section of the sleeve.

14. The articulated joint according to claim 12, wherein the first and/or the second longitudinal section has the stop between the inner wall of the sleeve and the internal thread that is transverse to the longitudinal extension of the sleeve, and wherein an additional internal thread is disposed in the central opening of the first and/or second expansion element, said additional internal thread having a thread diameter that is larger than the thread diameter of the internal thread in the first longitudinal section of the sleeve; and wherein the additional internal thread forms the support element for screwing in a release bolt that forms the means of release, having wherein the release bolt has an external thread that is larger than the internal thread in the central bore.

15. The articulated joint according to claim 11, wherein the sleeve is a continuous sleeve and a second bore, having an inner diameter that corresponds to the outer diameter of the sleeve, is provided in the first rigid element, wherein the inner diameter of the second bore and the outer diameter of the sleeve are selected in such a way that the first rigid elements is turnable together with the second bore relative to the sleeve, wherein a second expansion element is disposed inside the sleeve located opposite the first expansion element, and the second expansion element has a central opening and an internal thread placed therein, wherein the internal thread of the second expansion element corresponds to the external thread of the tensioning bolt, wherein the second expansion element forms the support element.

16. The articulated joint according to claim 11, wherein the tensioning bolt on a section of the shank of the tensioning bolt has a ledge having an enlarged diameter, the diameter of the ledge being larger than the central opening in the first expansion element and the ledge has the stop on the side facing the first expansion element, wherein the tensioning bolt with the ledge simultaneously forms the means of release.

* * * * *

UNITED STATES PATENT AND TRADEMARK OFFICE
CERTIFICATE OF CORRECTION

PATENT NO.       : 10,010,964 B2
APPLICATION NO.  : 14/477936
DATED            : July 3, 2018
INVENTOR(S)      : Lutgenau Page 1 of 1

It is certified that error appears in the above-identified patent and that said Letters Patent is hereby corrected as shown below:

In the Claims

Column 18, Line 21 (Claim 14) "having wherein the release bolt" should read --wherein the release bolt--.

Signed and Sealed this
Twenty-fifth Day of September, 2018

Andrei Iancu
*Director of the United States Patent and Trademark Office*